United States Patent
Yan et al.

(10) Patent No.: US 9,363,849 B2
(45) Date of Patent: Jun. 7, 2016

(54) SINGLE ANTENNA SHARING FOR MULTIPLE WIRELESS CONNECTIONS

(71) Applicant: QUALCOMM Incorporated, San Diego, CA (US)

(72) Inventors: Hongbo Yan, Vista, CA (US); Francis Ming-Meng Ngai, Louisville, CO (US); Daniel Fred Filipovic, Solana Beach, CA (US); Ning He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 74 days.

(21) Appl. No.: 14/215,128

(22) Filed: Mar. 17, 2014

(65) Prior Publication Data

US 2015/0264743 A1    Sep. 17, 2015

(51) Int. Cl.
*H04M 1/00* (2006.01)
*H04W 88/06* (2009.01)
*H04B 1/403* (2015.01)
*H04B 7/08* (2006.01)
*H04B 7/06* (2006.01)

(52) U.S. Cl.
CPC .............. *H04W 88/06* (2013.01); *H04B 1/406* (2013.01); *H04B 7/0805* (2013.01); *H04B 7/0608* (2013.01)

(58) Field of Classification Search
USPC .......... 455/550.1, 552.1, 19, 82, 562.1, 575.7
See application file for complete search history.

(56) References Cited

U.S. PATENT DOCUMENTS

| | | | |
|---|---|---|---|
| 6,476,769 B1 | 11/2002 | Lehtola | |
| 8,351,849 B2 | 1/2013 | Ying | |
| 8,447,255 B2 | 5/2013 | Asokan | |
| 2009/0323651 A1 | 12/2009 | Sharaga et al. | |
| 2011/0111708 A1 | 5/2011 | Tu et al. | |
| 2011/0250926 A1 | 10/2011 | Wietfeldt et al. | |
| 2012/0115553 A1* | 5/2012 | Mahe | H04B 7/0825 455/575.7 |
| 2012/0282982 A1* | 11/2012 | Mujtaba | H04W 52/0245 455/574 |
| 2013/0017797 A1 | 1/2013 | Ramasamy et al. | |
| 2013/0040671 A1* | 2/2013 | Zawaideh | H04W 88/06 455/500 |
| 2013/0310045 A1* | 11/2013 | Yan | H04B 7/0608 455/437 |
| 2014/0073371 A1 | 3/2014 | Mujtaba et al. | |

OTHER PUBLICATIONS

1 International Search Report and Written Opinion—PCT/US2015/020588—ISA/EPO—Jun. 12, 2015.

* cited by examiner

*Primary Examiner* — Fayyaz Alam
(74) *Attorney, Agent, or Firm* — The Marbury Law Group, PLLC (57) ABSTRACT

A wireless device includes: a first radio and first transceiver configured to transmit and receive according to a first radio access technology; a second radio and second transceiver configured to transmit and receive according to a second radio access technology; a first antenna and a second antenna connected to the first radio and the second radio; a switch; and a control unit configured to control the switch to configure connections of the first and second antennas to the first and second radios. The control unit is configured to control the switch to disconnect the second radio from the second antenna in response to a receiving, by the second radio through the second antenna, a signal that is below a predetermined threshold, and to connect the second radio to the first antenna during a wakeup period of the second radio.

20 Claims, 4 Drawing Sheets

SINGLE ANTENNA SHARING FOR MULTIPLE WIRELESS CONNECTIONS

BACKGROUND

Antenna switching can be used to improve the performance of a wireless communication device (also referred to herein as a "user equipment" or "UE"). It is especially useful for handheld devices as they may suffer significant performance degradation when the antenna is blocked. In some extreme cases, wireless communications can be completely stopped as a consequence of a blocked antenna. If the UE only supports one radio at a given moment, the performance degradation problem can be mitigated by the conventional switching strategy of switching primary transmit/receive functions to an antenna that is not blocked. However, if the UE supports multiple radios simultaneously, for example Global System for Mobile telecommunications (GSM) and Wideband Code Division Multiple Access (WCDMA) radios, a significant drawback of such known switching strategies is that even with such switching, one radio may still be unusable as a result of a blocked antenna.

SUMMARY

Wireless devices, systems, and methods for antenna switching in a wireless device are provided.

According to a first aspect a wireless device may include: a first base band processor of a first radio access technology and a first transceiver configured to transmit and receive according to a first radio access technology; a second base band processor of a second radio access technology and a second transceiver configured to transmit and receive according to a second radio access technology; a first antenna and a second antenna, each configurable to connect to the first transceiver and the second transceiver; a switch coupled with the first radio and the second radio; and a control unit configured to control the switch to configure connections of the first and second antennas to the first and second transceivers.

In this aspect, the control unit may be configured to control the switch to disconnect the second transceiver from the second antenna in response to receiving a signal by the second radio that is below a predetermined threshold, maintain the first radio in its current mode, and connect the second transceiver to the first antenna during a wakeup period of the second radio.

According to another aspect a method of antenna switching in a wireless device may include: determining whether a signal received through an antenna assigned to a second radio access technology falls below a predetermined threshold; disconnecting the second radio access technology from its assigned antenna in response to the received signal falling below the predetermined threshold; maintaining a first radio access technology in its current mode; and connecting the second radio access technology to an antenna assigned to the first radio access technology during a wakeup period of the second radio access technology.

According to another aspect a wireless device may include: a first radio configured to transmit and receive according to a first radio access technology; a second radio configured to transmit and receive according to a second radio access technology; a first antenna and a second antenna; a switch configured to connect each of the first radio and the second radio to one of the first antenna and a second antenna; and a control unit configured to control the switch to configure connections of the first and second antennas to the first and second transceivers. In this aspect, the control unit may control the switch to disconnect the second radio from the second antenna in response to receiving by the second radio through the second antenna a signal that is below a predetermined threshold, set the second radio to idle mode if the second radio is not in idle mode, and disconnect the first radio from the first antenna and connect the second radio to the first antenna during a wakeup period of the second radio.

According to another aspect a wireless device may include a first base band processor of a first radio access technology and a first transceiver configured to transmit and receive according to the first radio access technology, a second base band processor of a second radio access technology and second transceiver configured to transmit and receive according to the second radio access technology, a first antenna and a second antenna, connected to the first transceiver and the second transceiver, respectively, a switch coupled with the first and second base band processors and the first and second transceivers, and a control unit configured to control the switch to configure connections of the first and second transceivers to the first and second base band processors. In this aspect, the control unit controls the switch to disconnect the second base band processor from the second transceiver in response to receiving by the second base band processor through the second antenna a signal that is below a predetermined threshold, set the second base band processor to idle mode if the second base band processor is not in idle mode, and disconnect the first base band processor from the first transceiver, connects the second base band processor to the first transceiver, and configures the first transceiver according to the second radio access technology during a wakeup period of the second base band processor.

According to another aspect a communication system may include: a plurality of radio access technology networks; and one or more wireless devices, each device of the plurality of devices communicating with at least one of the plurality of radio access technology networks, a plurality of antennas equipped on a device, each assigned to at least one radio access technology; and a control unit configured to control connections of the plurality of radio access technologiess to the plurality of antennas. In this aspect, the control unit may control a switch to disconnect the first radio access technology from its assigned antenna in response to a first radio access technology of the plurality of radio access technologiess through its assigned antenna from one of the communication networks associated with the first radio access technology receiving a signal that is below a predetermined threshold, and connect the first radio access technology to share an antenna assigned to second radio access technology of the plurality of radio access technologiess while maintaining the connection of the second radio access technology in current mode to its assigned antenna, and set the first radio access technology to idle mode if the first radio access technology is not in idle mode.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

While certain embodiments are described, these embodiments are presented by way of example only, and are not intended to limit the scope of protection. The apparatuses, methods, and systems described herein may be embodied in a variety of other forms. Furthermore, various omissions, substitutions, and changes in the form of the example methods and systems described herein may be made without departing from the scope of protection.

The present inventive concept provides apparatuses, systems, and methods for using one viable antenna for two radios when the other antenna is blocked on a wireless device.

Figure 1:
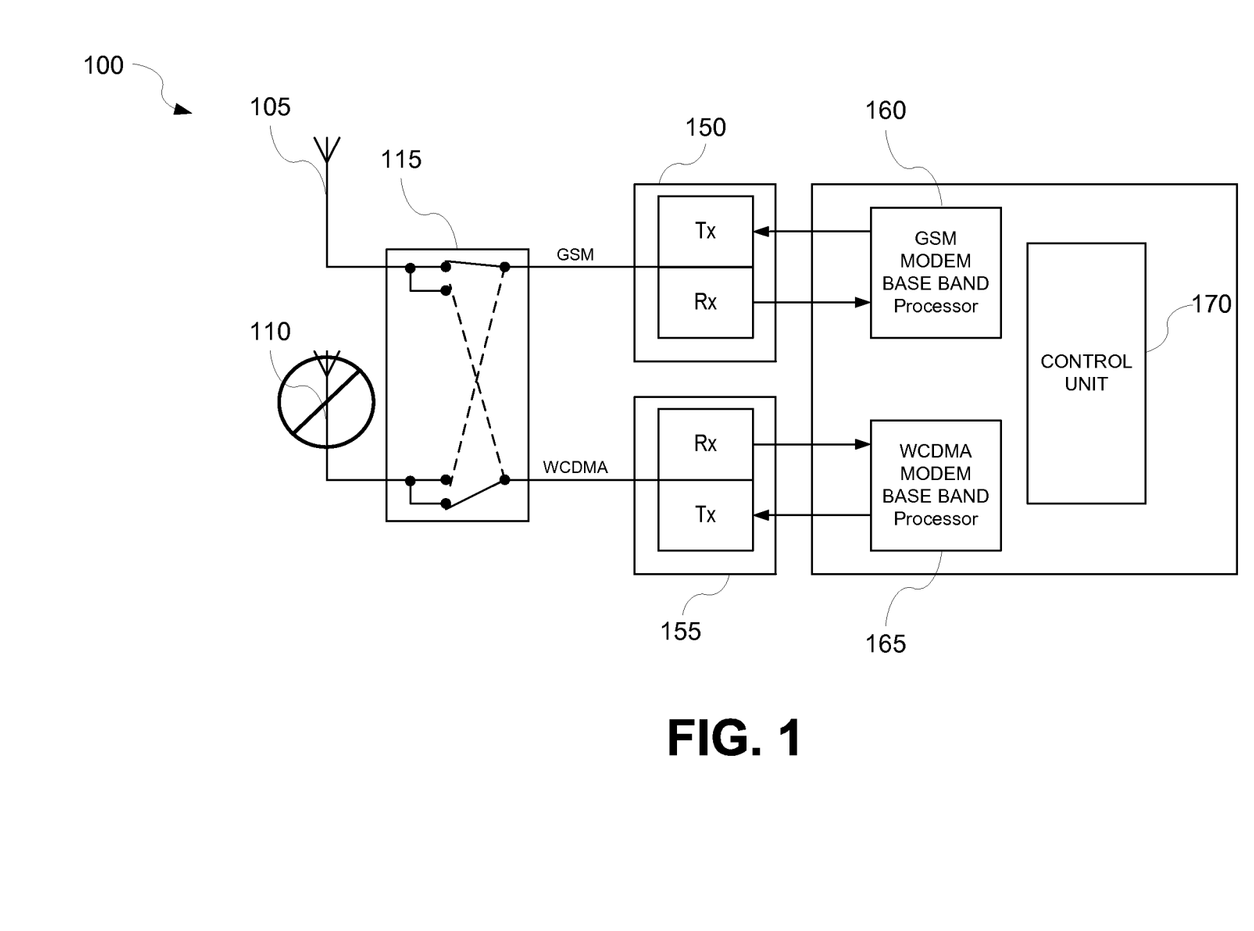
FIG. 1 is a functional block diagram of a wireless device according to various embodiments of the disclosure.

FIG. 1 is a functional block diagram of a wireless device according to an example embodiment of the present inventive concept. Referring to FIG. 1, a wireless device 100 includes a first antenna 105 and a second antenna 110. The first antenna 105 and the second antenna 110 are coupled to a first radio frequency (RF) switch 115. The first RF switch 115 is operable to couple the first antenna 105 and the second antenna 110 to first and second RF transceivers 150, 155. The first transceiver 150 receives signals from and supplies signals to a base band processor 160 of a first radio access technology (also referred to as a first radio), such a GSM radio access technology. The second transceiver 155 receives signals from and supplies signals to a base band processor 165 of a second radio access technology (also referred to as a second radio), such as a WCDMA radio access technology.

A control unit 170 controls operations of the wireless device 100 including, but not limited to, determination of acceptable received signal quality (for example, but not limited to reference signal received power (RSRP), received signal code power (RSCP), received signal strength indicator (RSSI), and signal-to-noise ratio (SNR)), radio control, antenna switching, etc.). The control unit 170 may be a programmable device implemented as, for example, but not limited to, a processor configured with processor-executable instructions, application specific integrated circuit (ASIC)/field programmable gate array (FPGA), or dedicated hardware.

In the example embodiments illustrated in FIG. 1, if a blocked antenna (e.g., the second antenna 110) results in the received signal falling below a predetermined threshold, or if there are pending events such as failing S-criteria, neighbor cell search or frequency scan, triggered by weak reception and/or radio link failure (RLF), for example as a result of attenuation at the antenna caused by the position of a user's hand on the wireless device, control of the first RF switch 115 allows transmit/receive (Tx/Rx) operation of one of the GSM or WCDMA radio access technology base band processor 160, 165 and receive (Rx) operation of the other radio access technology base band processor using the viable first antenna 105.

A radio may be in idle mode or active mode. In idle mode, a radio receives but does not transmit signals. In active mode, a radio receives and transmits signals. A radio may be set to idle mode from active mode due to low signal quality (low SNR) or low signal strength (low RSSI, RSRP, RSCP etc.) and/or decoding failures of broadcast channel (BCH) or paging channel (PCH), etc.

When sharing the viable antenna, the radio that experienced the outage on its designated antenna will tune away to the newly shared antenna using information acquired before the outage, including timing and frequency offset observed in the down link (DL) signal, radio network temporary identifier (RNTI), cell ID etc.

Tune away occurs only during the idle mode radio's wake-up periods. During tune away, the RF switch 115 may be configured to disconnect the transceiver of one radio access technology from the viable antenna and connect the transceiver of the other radio access technology to the viable antenna. For example, assuming the second antenna 110 is blocked, the WCDMA radio access technology base band processor 165 may be set to idle mode if it was previously in active mode. The control unit 170 may configure the RF switch 115 to disconnect the first transceiver (also referred to as the WCDMA transceiver) 155 from the blocked antenna 110.

During a wakeup period of the WCDMA radio access technology base band processor 165, the control unit 170 may configure the RF switch 115 to disconnect the second transceiver (also referred to as the GSM transceiver) 150 from the viable antenna 105 and connect the WCDMA transceiver 155 to the viable antenna 105. At the end of the WCDMA radio access technology base band processor 165 wakeup period, the control unit 170 may configure the RF switch 115 to disconnect the WCDMA radio access technology base band processor 165 from the viable antenna 105 and reconnect the GSM transceiver 150 to the viable antenna 105.

Figure 2:
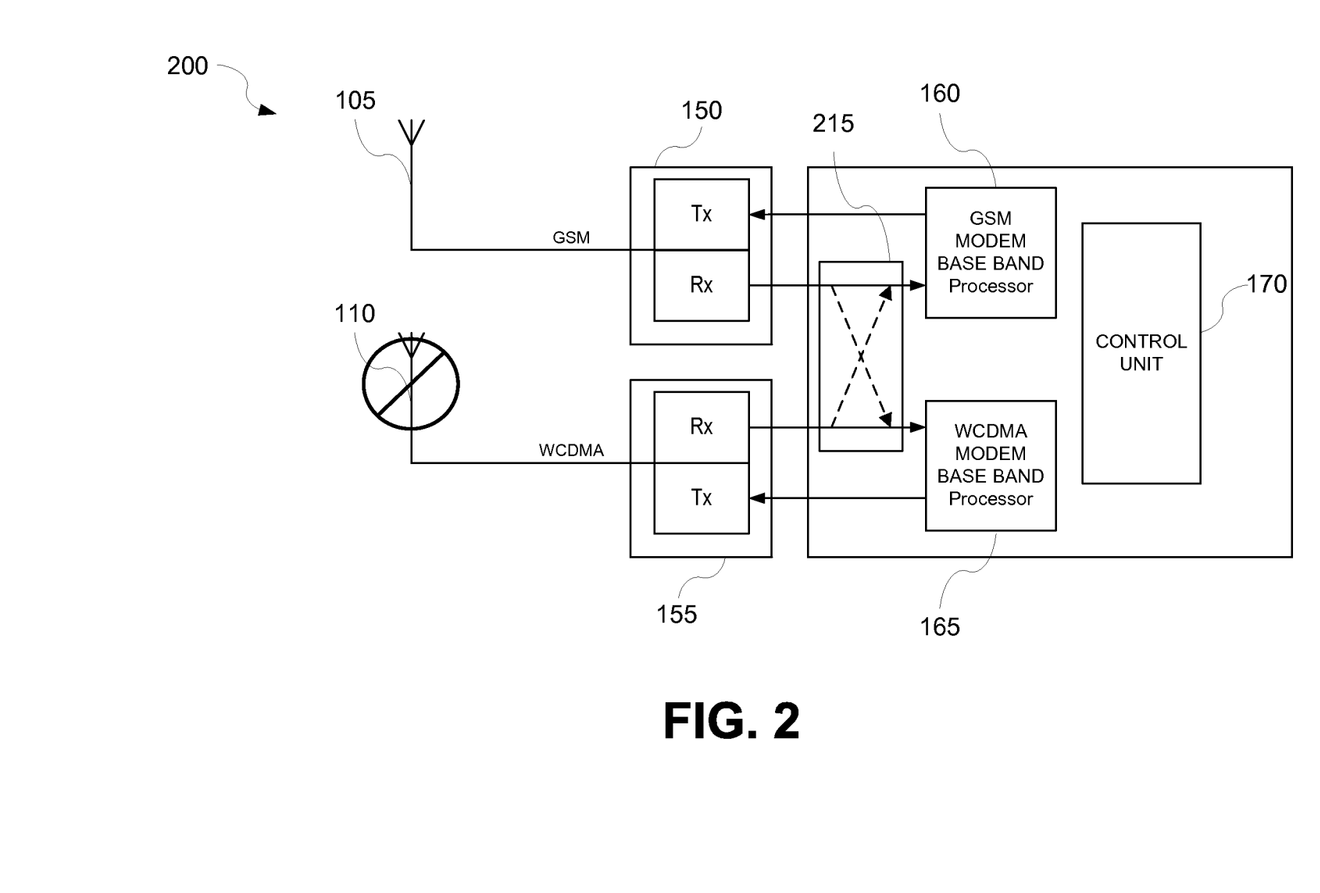
FIG. 2 is a functional block diagram of a wireless device according to various embodiments of the disclosure.

FIG. 2 is a functional block diagram of a wireless device according to various embodiments of the disclosure. In FIG. 2, elements that are the same as those in FIG. 1 are denoted with like reference numerals and serve like functions. Elements of the example embodiment illustrated in FIG. 1 that are not included in the example embodiment of FIG. 2 are not illustrated in FIG. 2.

Referring to FIG. 2, a second switch 215 is operable to couple a signal received by the first antenna 105 output by the first transceiver 150 to either the first radio access technology (in this example, the GSM radio access technology base band processor 160) or the second radio access technology (in this example, the WCDMA radio access technology base band processor 165). One of ordinary skill in the art will appreciate that the second switch 215 may be configured to couple signals to either radio access technology from either antenna without departing from the scope of the present inventive concept.

If a received signal falls below a predetermined threshold, or if there are pending events such as failing S-criteria, neighbor cell search, or frequency scan, triggered by weak reception and/or RLF because one antenna is blocked (e.g., the second antenna 110), control of the second switch 215 allows transmit/receive (Tx/Rx) operation of one of the GSM or WCDMA radio access technologies in the active mode and receive (Rx) operation of the other radio access technology in the idle mode during tune away using the viable first antenna 105.

Tune away occurs only during the idle mode radio access technology's wake-up periods. During tune away, the second switch 215 will be configured to disconnect one radio access technology from the viable antenna and connect the other radio access technology to the viable antenna. For example, assuming the second antenna 110 is blocked, the WCDMA radio access technology base band processor 165 may be set to idle mode if it was previously in active mode. The control unit 170 may configure the second switch 215 to disconnect the WCDMA radio access technology base band processor 165 from the WCDMA transceiver 155, thereby disconnecting the WCDMA radio access technology base band processor 165 from the blocked antenna 110.

During a wakeup period of the WCDMA radio access technology base band processor 165, the control unit 170 may configure the second switch 215 to disconnect the GSM radio access technology base band processor 160 from the GSM transceiver 150 connected to the viable antenna 105, and connect the WCDMA radio access technology base band processor 165 to the GSM transceiver 150, which is connected to the viable antenna 105. The control unit 170 may reconfigure the GSM transceiver 150 to permit the WCDMA radio access technology base band processor 165 to receive signals from the WCDMA network.

At the end of the WCDMA radio access technology base band processor 165 wakeup period, the control unit 170 may configure the second switch 215 to disconnect the WCDMA radio 165 from the GSM transceiver 150, which is connected to the viable antenna 105, and reconnect the GSM transceiver 150 to the GSM radio access technology base band processor 160. The control unit 170 may reconfigure the GSM transceiver 150 to tune back to the GSM network.

Figure 3:
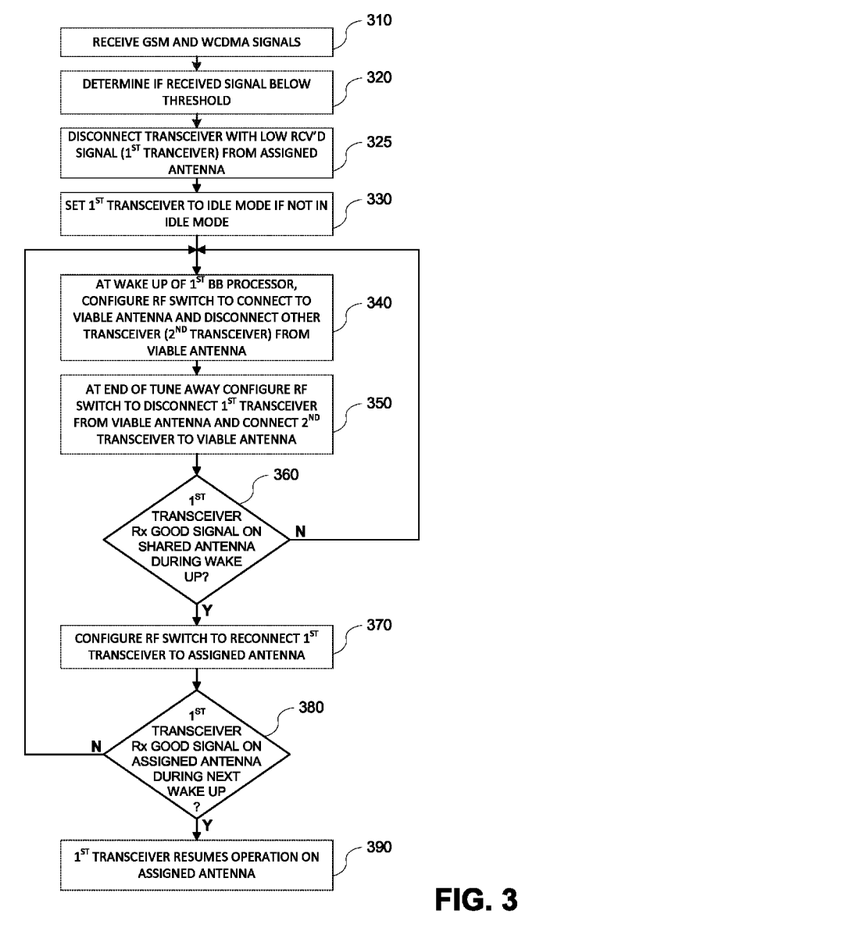
FIG. 3 is a flowchart illustrating a method for antenna selection in a dual-radio wireless device according to various embodiments of the disclosure.

FIG. 3 is a flowchart illustrating a method for antenna selection in a dual-radio wireless device according to various embodiments of the disclosure. With reference to FIGS. 1 and 3, the wireless device 100 receives GSM and WCDMA signals on the separate antennas 105, 110 (310).

The control unit 170 may determine that the signal received on one of the antennas (in this example, the second antenna 110) falls below a predetermined threshold for acceptable reception due to, for example, but not limited to, low signal strength (RSRP, RSCP, etc.) and/or decoding failures of BCH or PCH, etc. (320). Low received signal strength may result from, for example, attenuation at the antenna caused by the position of a user's hand on the wireless device.

If the signal received on one of the antennas (in this example, the second antenna 110) falls below a predetermined threshold, the control unit 170 configures the RF switch 115 to disconnect the transceiver of the radio access technology (in this example, the WCDMA transceiver 155) assigned to the second antenna 110 from that antenna (325) and sets the radio access technology to idle mode if the radio is not already in idle mode while the other radio access technology (in this example, the GSM radio access technology base band processor 160) remains in its current mode (330).

During a wakeup period of the WCDMA radio access technology base band processor 165 ("BB Processor" in the drawings) the control unit 170 configures the first RF switch 115 to disconnect the transceiver 150 for the GSM radio access technology from the viable first antenna 105 and connect the transceiver 155 for the WCDMA radio access technology to the viable first antenna 105 (340).

The WCDMA radio 165 receives signals from the WCDMA network on the newly shared antenna using information acquired before the outage, including timing and frequency offset observed in the DL signal, RNTI, cell ID etc. At the end of the WCDMA radio access technology wakeup period, the control unit 170 configures the RF switch 115 to disconnect the transceiver 155 for the WCDMA radio access technology from the viable antenna 105 and reconnect the transceiver 150 for the GSM radio access technology to the viable antenna 105 (350).

While sharing the viable first antenna 105, if the WCDMA transceiver 155 and radio access technology base band processor 165 receive signals with acceptable signal quality, i.e., signals having adequate power for reception, during a wakeup period (360-Y), the control unit 170 configures the first RF switch 115 to couple the WCDMA transceiver 155 and radio access technology base band processor 165 to receive on the non-shared second antenna 110 during the next wakeup period (370). If the WCDMA transceiver 155 and radio access technology base band processor 165 receive signals with acceptable signal quality on the non-shared second antenna 110 during the next wakeup period (380-Y), the WCDMA transceiver 155 and radio access technology base band processor 165 resume normal operation on the non-shared second antenna 110 (390).

Otherwise (380-N), the control unit 170 configures the first RF switch 115 to couple the WCDMA radio 165 to receive on the viable first antenna 105 (340) during the next WCDMA radio access technology base band processor 165 wakeup period and antenna sharing continues. In some embodiments, if the received signal quality of the active mode radio is marginal (below the predetermined threshold, but above a second predetermined threshold), for example, having a SNR within a few dB (e.g., within about 3 dB) of the level at which call drops would typically occur, one or more of the wake-up periods of the idle mode radio may be skipped to minimize the impact on reception by the active mode radio.

Figure 4:
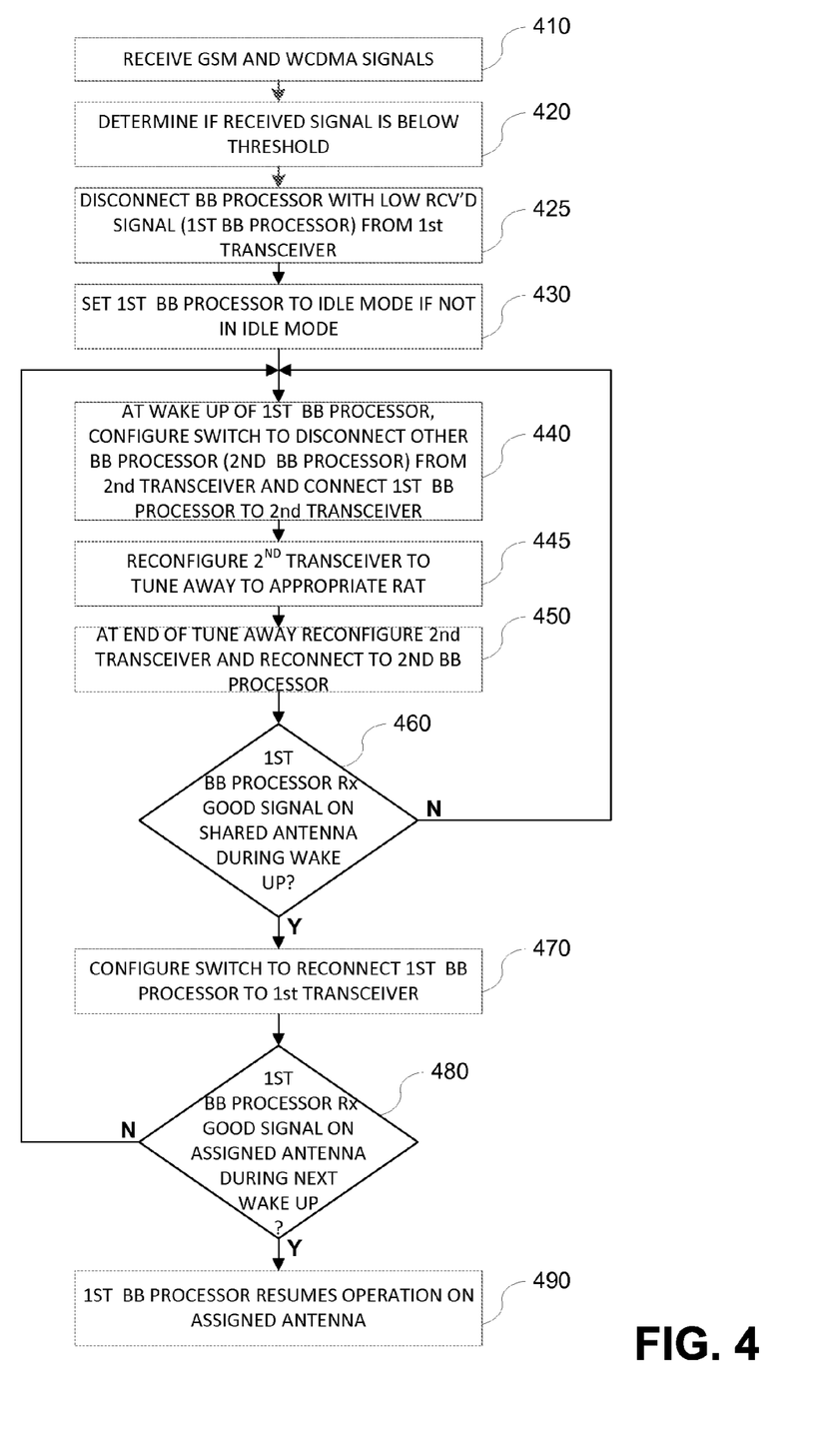
FIG. 4 is a flowchart illustrating a method for antenna selection in a dual-radio wireless device according to various embodiments of the disclosure.

FIG. 4 is a flowchart illustrating a method for antenna selection in a dual-radio wireless device according to various embodiments of the disclosure. With reference to FIGS. 2 and 4, the wireless device 200 receives GSM and WCDMA signals on the separate antennas 105, 110 (410).

The control unit 170 may determine that the signal received on one of the antennas (in this example, the second antenna 110) falls below a predetermined threshold for acceptable reception due to, for example, but not limited to, low signal strength (low RSSI, RSRP, RSCP etc.) and/or decoding failures of BCH or PCH, etc. (420). Low received signal strength may result from, for example, attenuation at the antenna caused by the position of a user's hand on the wireless device.

If the signal received on one of the antennas (in this example, the second antenna 110) falls below a predetermined threshold, the control unit 170 configures the second switch 215 to disconnect the base band processor (in this example, the WCDMA radio access technology base band processor 165) from the transceiver (in this example, the second transceiver, also referred to as the WCDMA transceiver 155) connected to the blocked antenna 110 (425) and sets the radio access technology base band processor to idle mode if the radio is not already in idle mode while the other radio access technology base band processor (in this example, the GSM radio access technology base band processor 160) remains in its current mode (430).

During a wakeup period of the WCDMA radio access technology base band processor 165 the control unit 170 configures the second switch 215 to disconnect the transceiver (in this example, the first transceiver, also referred to as the GSM transceiver 150) connected to the viable first antenna 105 from the GSM radio access technology base band processor 160 and connect the WCDMA radio access technology base band processor 165 to the GSM transceiver 150 (440). The control unit 170 reconfigures the GSM transceiver 150 to tune away to the appropriate radio access technology, in this example, WCDMA to permit the WCDMA radio access technology base band processor 165 to receive signals from the WCDMA network (445). One of ordinary skill in the art will appreciate that the tune away is performed to the radio access technology of the radio in idle mode.

The WCDMA radio access technology base band processor 165 receives signals from the WCDMA network on the newly shared antenna using information acquired before the outage, including timing and frequency offset observed in the DL signal, RNTI, cell ID etc. At the end of the WCDMA radio access technology base band processor 165 wakeup period, the control unit 170 configures the second switch 215 to disconnect the GSM transceiver 150 from the WCDMA radio access technology base band processor 165, reconnect the GSM transceiver 150 to the GSM radio access technology base band processor 160, and reconfigures the GSM transceiver 150 back to GSM mode, thereby reconnecting the GSM radio access technology base band processor 160 to the viable antenna 105 (450).

While sharing the viable first antenna 105, if the WCDMA radio access technology base band processor 165 receives signals with acceptable signal quality, i.e., signals having adequate power for reception, during a wakeup period (460-Y), the control unit 170 configures the second switch 215 to couple the WCDMA radio access technology base band processor 165 to the WCDMA transceiver 155 to receive on the non-shared second antenna 110 during the next wakeup period (470). If the WCDMA radio access technology base band processor 165 receives signals with acceptable signal quality on the non-shared second antenna 110 during the next wakeup period (480-Y), the WCDMA radio access technology base band processor 165 resumes normal operation on the non-shared second antenna 110 (490).

Otherwise (480-N), the control unit 170 configures the second switch 215 to couple the WCDMA radio access technology base band processor 165 to receive on the viable first antenna 105 during the next WCDMA radio access technology base band processor 165 wakeup period (440) and antenna sharing continues. In some embodiments, if the received signal quality of the active mode radio is marginal, for example, having a SNR within a few dB (e.g., within about 3 dB) of the level at which call drops would typically occur, one or more of the wake-up periods of the idle mode radio may be skipped to minimize the impact on reception by the active mode radio.

One of ordinary skill in the art will also appreciate that while the example embodiments have been illustrated and described using two radios and two antennas operating in a particular configuration, the scope of the present inventive concept extends to devices having multiple radios and multiple antennas and/or operating in other configurations.

While certain embodiments have been described, these embodiments have been presented by way of example only, and are not intended to limit the scope of the protection. The apparatuses, methods, and systems described herein may be embodied in a variety of other forms. Various omissions, substitutions, and/or changes in the form of the example apparatuses, methods, and systems described in this disclosure may be made without departing from the spirit of the protection.

The accompanying claims and their equivalents are intended to cover such forms or modifications as would fall within the scope and spirit of the protection. For example, the example apparatuses, methods, and systems disclosed herein can be applied to multi-SIM wireless devices subscribing to multiple communication networks and/or communication technologies. The various components illustrated in the figures may be implemented as, for example, but not limited to, software and/or firmware on a processor, ASIC/FPGA/DSP, or dedicated hardware. Also, the features and attributes of the specific example embodiments disclosed above may be combined in different ways to form additional embodiments, all of which fall within the scope of the present disclosure.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in processor-executable instructions that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A wireless device, comprising:
   a first radio configured to transmit and receive according to a first radio access technology, wherein the first radio comprises a first base band processor;
   a second radio configured to transmit and receive according to a second radio access technology that is different from the first radio access technology, wherein the second radio comprises a second base band processor;
   a first antenna assigned to the first radio and a second antenna assigned to the second radio, wherein the first and second antennas are each configurable to connect to the first radio and the second radio;
   and
   a control unit configured to control a switch to configure connections of the first and second antennas to the first and second radios,
   wherein the control unit is configured to:
   control the switch to disconnect the second radio from the second antenna in response to receiving a signal by the second radio through the second antenna that is below a predetermined threshold;
   maintain the first radio in a current mode; and
   control the switch to connect the second radio to the first antenna during a wakeup period associated with the second radio access technology, wherein the second radio receives signals through the first antenna from a network using the second radio access technology.

2. The wireless device of claim 1, wherein the control unit is further configured to set the second radio to idle mode if the second radio is not in idle mode when disconnected from the second antenna.

3. The wireless device of claim 1, wherein, during the wakeup period associated with the second radio access technology, the control unit is further configured to:
   control the switch to disconnect the first radio from the first antenna;
   and
   control the switch to reconnect the first radio to the first antenna at the end of the wakeup period associated with the second radio access technology.

4. The wireless device of claim 1, wherein the control unit is further configured to control the second radio to skip one or more wake-up periods if the received signal of the first radio is determined to be below the predetermined threshold, but above a second predetermined threshold.

5. The wireless device of claim 1, wherein the control unit is further configured to control the switch to disconnect the second radio from the first antenna and connect the second radio to the second antenna to receive on the second antenna during a next wakeup period in response to the second radio receiving a signal having a signal reception that exceeds a threshold during the wakeup period associated with the second radio access technology.

6. The wireless device of claim 5, wherein the control unit is further configured to maintain the connection of the second radio to the second antenna in response to the second radio receiving a signal having a signal reception that exceeds the threshold through the second antenna during the next wakeup period.

7. The wireless device of claim 1, wherein the first radio access technology is one of one of wideband code division multiple access (WCDMA) and global system for mobile communication (GSM) and the second radio access technology is the other of WCDMA and GSM.

8. A method for antenna selection in a wireless device having a first radio associated with a first radio access technology and a second radio associated with a second radio access technology different from the first radio access technology, wherein the first and second radios each comprise a base band processor, the method comprising:
   determining whether a signal received through an antenna assigned to the second radio falls below a predetermined threshold;
   disconnecting the second radio from the antenna assigned to the second radio in response to determining that the received signal is below the predetermined threshold;
   maintaining the first radio in a current mode; and
   connecting the second radio to an antenna assigned to the first radio during a wakeup period associated with the second radio access technology, wherein the second radio receives signals through the antenna assigned to the first radio from a network using the second radio access technology.

9. The method of claim 8, wherein disconnecting the second radio from the antenna assigned to the second radio further comprises setting the second radio to idle mode if the second radio is not in idle mode.

10. The method of claim 8, wherein connecting the second radio to the antenna assigned to the first radio during the wakeup period associated with the second radio access technology comprises:
    disconnecting the first radio from the antenna assigned to the first radio;
    and
    reconnecting the first radio to the antenna assigned to the first radio at the end of the wakeup period associated with the second radio access technology.

11. The method of claim 8, further comprising skipping one or more wake-up periods if the received signal of the first radio is determined to be below the predetermined threshold, but above a second predetermined threshold.

12. The method of claim 8, further comprises:
    disconnecting the second radio from the antenna assigned to the first radio in response to receiving a signal having a signal reception that exceeds a threshold during the wakeup period associated with the second radio access technology; and
    reconnecting the second radio to the antenna assigned to the second radio to receive during a next wakeup period.

13. The method of claim 12, further comprising maintaining the connection of the second radio to the antenna assigned to the second radio in response to the second radio receiving a signal having a signal reception that exceeds the threshold through its assigned antenna during the next wakeup period.

14. The method of claim 8, wherein:
    the first radio is configured to transmit and receive according to the first radio access technology; and
    the second radio is configured to transmit and receive according to the second radio access technology.

15. The method of claim 8, wherein the first radio access technology is one of one of wideband code division multiple access (WCDMA) and global system for mobile communication (GSM) and the second radio access technology is the other of WCDMA and GSM.

16. A wireless device, comprising:
- a first radio comprising a first base band processor, wherein the first radio is configured to transmit and receive according to a first radio access technology;
- a second radio comprising a second base band processor, wherein the second radio is configured to transmit and receive according to a second radio access technology that is different from the first radio access technology;
- a first antenna and a second antenna respectively assigned to the first and second radios;
- and
- a control unit configured to perform operations to control a switch to configure connections of the first and second antennas to the first and second radios in response to receiving, by the second radio through the second antenna, a signal that is below a predetermined threshold, the control unit configured to:
  - control the switch to disconnect the second radio from the second antenna;
  - set the second radio to idle mode if the second radio is not in idle mode;
  - control the switch to connect the second radio to the first antenna during a wakeup period associated with the second radio access technology, wherein the second radio receives signals through the first antenna from a network using the second radio access technology; and
  - control the switch to disconnect the first radio from the first antenna during the wakeup period associated with the second radio access technology.

17. The wireless device of claim 16, wherein the control unit is further configured to disconnect the second radio from the first antenna and connect the second radio to the second antenna to receive on the second antenna during a next wakeup period in response to the second radio receiving a signal having a signal reception that exceeds a threshold during the wakeup period associated with the second radio access technology.

18. The wireless device of claim 17, wherein the control unit is further configured to maintain the connection of the second radio to the second antenna in response to the second radio receiving a signal having a signal reception that exceeds the threshold through the second antenna during the next wakeup period.

19. The wireless device of claim 16, wherein the control unit is further configured to control the second radio to skip one or more wake-up periods if the received signal of the first radio is determined to be below the predetermined threshold, but above a second predetermined threshold.

20. The wireless device of claim 16, wherein the first radio access technology is one of one of wideband code division multiple access (WCDMA) and global system for mobile communication (GSM) and the second radio access technology is the other of WCDMA and GSM.

* * * * *